United States Patent
Schmitt et al.

(10) Patent No.: US 6,909,236 B2
(45) Date of Patent: Jun. 21, 2005

(54) METHOD FOR AUTOMATICALLY CONTROLLING LIGHTING DEVICES AND DEVICE FOR CARRYING OUT THE METHOD

(75) Inventors: Patrick Schmitt, Lichtenau (DE); Norbert Hog, Buehl (DE); Bruno Hodapp, Achern-Oensbach (DE); Gebhard Michenfelder, Lichtenau (DE); Hans Meier, Ottersweier (DE); Henry Blitzke, Buehl (DE); Andreas Schneider, Buehl (DE); Pierre Nonnenmacher, Niederschaeffolsh (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/344,468
(22) PCT Filed: Dec. 29, 2001
(86) PCT No.: PCT/DE01/04944
§ 371 (c)(1), (2), (4) Date: Feb. 11, 2003
(87) PCT Pub. No.: WO03/002373
PCT Pub. Date: Jan. 9, 2003

(65) Prior Publication Data
US 2003/0164689 A1 Sep. 4, 2003

(30) Foreign Application Priority Data
Jun. 15, 2001 (DE) .......................................... 101 28 995

(51) Int. Cl.⁷ ............................................... B60Q 1/02
(52) U.S. Cl. ..................... 315/82; 307/10.8; 340/935
(58) Field of Search .............................. 315/76–77, 82; 307/10.1, 10.8; 340/933, 935, 938, 942

(56) References Cited

U.S. PATENT DOCUMENTS

| | | | | |
|---|---|---|---|---|
| 4,638,295 A | * | 1/1987 | Middlebrook et al. | ...... 340/465 |
| 4,891,559 A | * | 1/1990 | Matsumoto et al. | .......... 315/82 |
| 4,959,755 A | * | 9/1990 | Hochstein | ...................... 362/4 |
| 5,012,392 A | * | 4/1991 | Hochstein | ...................... 362/4 |
| 5,176,234 A | * | 1/1993 | Reik et al. | ................. 192/53.2 |
| 5,222,156 A | * | 6/1993 | Sorimachi et al. | .......... 382/286 |
| 6,518,704 B1 | * | 2/2003 | Schuler | ....................... 315/82 |

FOREIGN PATENT DOCUMENTS

| | | |
|---|---|---|
| DE | 195 23 262 | 1/1997 |
| DE | 196 30 216 | 1/1998 |
| DE | 199 57 210 | 5/2001 |
| EP | 0 857 610 | 8/1998 |
| FR | 2 786 745 | 6/2000 |
| GB | 2 064 238 | 6/1981 |

\* cited by examiner

*Primary Examiner*—Thuy Vinh Tran
(74) *Attorney, Agent, or Firm*—Kenyon & Kenyon

(57) ABSTRACT

In a method for the automatic control of lighting devices, particularly of a motor vehicle, and a device for implementing the method, the brightness in a specific direction being detected by at least one directional sensor which emits direction signals to a control device, the control device switching on the lighting devices after a minimum time has elapsed. The minimum time begins when the direction signals exceed or drop below a switch-on threshold. The lighting devices are only switched on when the direction signals lie above or below the switch-on threshold during the entire minimum time. To that end, the control device is connected to a timer.

13 Claims, 2 Drawing Sheets

METHOD FOR AUTOMATICALLY CONTROLLING LIGHTING DEVICES AND DEVICE FOR CARRYING OUT THE METHOD

FIELD OF THE INVENTION

The present invention relates to a method and a device for the automatic control of lighting devices, particularly of a motor vehicle.

BACKGROUND INFORMATION

There are numerous devices for the automatic control of lighting devices of motor vehicles, such as those described, for example, in German Published Patent Application No. 195 23 262. These sensor devices include a global sensor detecting the general light conditions in the vicinity of the vehicle in a non-directional manner, and at least one directional sensor detecting the light conditions in the travel direction in front of the vehicle in a directional manner, as well as a control device which controls the lighting devices of the vehicle as a function of the signals emitted by the sensors. In this context, the lighting devices are switched on, for example, when the global light sensor reports brightness, but the directional sensor reports darkness as is the case, for instance, in front of a tunnel entrance.

SUMMARY

The method of the present invention may provide that the lighting devices are first switched on after a minimum time has elapsed which begins when the directional signals exceed a switch-on threshold and lie above this switch-on threshold during the entire minimum time. Using this method, bridges may be reliably recognized and distinguished from tunnels, a disturbing blinking-light effect of the lighting devices being avoided. It may be ensured that the lighting devices are not activated unnecessarily, and are deactivated again only after the switch-off delay time has elapsed, or after dropping below a switch-off threshold.

The lighting devices may be first switched on when the direction signals conveyed by the directional sensor are rising monotonically, particularly strictly monotonically, during the entire minimum time. It is thus possible to recognize whether the brightness increases again before the minimum time has elapsed, which points to the end of the dark period and thus of the bridge.

If the directional sensor has an acquisition cone, pointing in the direction of travel when in the installed state, with an acceptance angle less than 90°, a particularly good contrast ratio may result when the vehicle is located in front of a dark object such as a tunnel.

If the minimum time is determined in view of the ambient brightness, which is detected by a global sensor, then it may be adjusted optimally to the ambient conditions.

The minimum time may be determined in view of the speed of the motor vehicle, since on one hand, the lighting devices should be switched on earlier at higher speeds, and on the other hand, short dark sections like bridges, for example, are traveled through in a shorter time.

If the minimum time is read from a table in the memory of the control device as a function of the ambient brightness and/or the speed, the method of the present invention may then be implemented in a simple manner.

The minimum time may be determined as a function of the horizontal direction in which the motor vehicle is moved and/or the time of day and/or the place at which the motor vehicle is located. In this manner, it is possible to compensate for effects dependent on the direction of travel which arise, for example, because, based on the position of the sun, during the evening hours the directional sensor detects substantially less brightness in the eastern direction than in the western direction and vice versa.

The lighting devices may be controlled with the aid of a timer which emits time signals to the control device controlling the lighting device. It is thus possible to avoid disturbing blinking-light effects which come about when traveling through short tunnels and bridges.

An exemplary embodiment of the present invention is explained in detail in the following description and is illustrated in the Figures.

DETAILED DESCRIPTION

Figure 1:
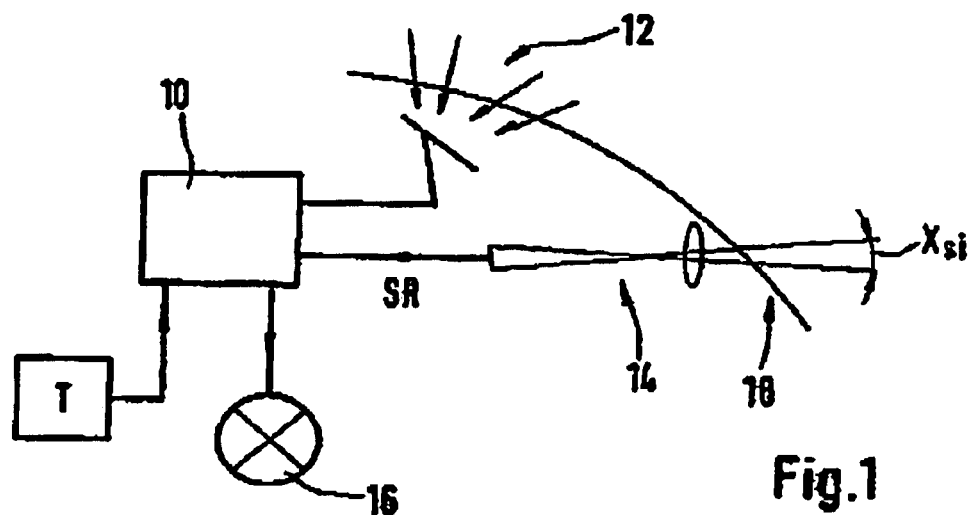
FIG. 1 is a schematic view of a device according to the present invention.

A device of the present invention is illustrated schematically in FIG. 1. It is made essentially of a control device 10, a global sensor 12, a directional sensor 14 and a timer T. Control device 10 is also connected to lighting devices 16 and is able to control them. To that end, control device 10 receives direction signals SR from directional sensor 14.

Directional sensor 14 and global sensor 12 are positioned in a motor vehicle, for example, on windshield 18. In this context, the directional sensor is aligned approximately in the direction of travel and has an acceptance cone Ψ of, for example, 30°. Global sensor 12, in a non-directional manner, measures the ambient brightness in the area of the motor vehicle.

If the vehicle is located in front of a tunnel, global sensor 12 conveys signals to control device 10 which—assuming normal daylight—indicate a relatively high ambient brightness. Directional sensor 14 conveys direction signals SR to control device 10 which already indicate darkness.

Figure 2:
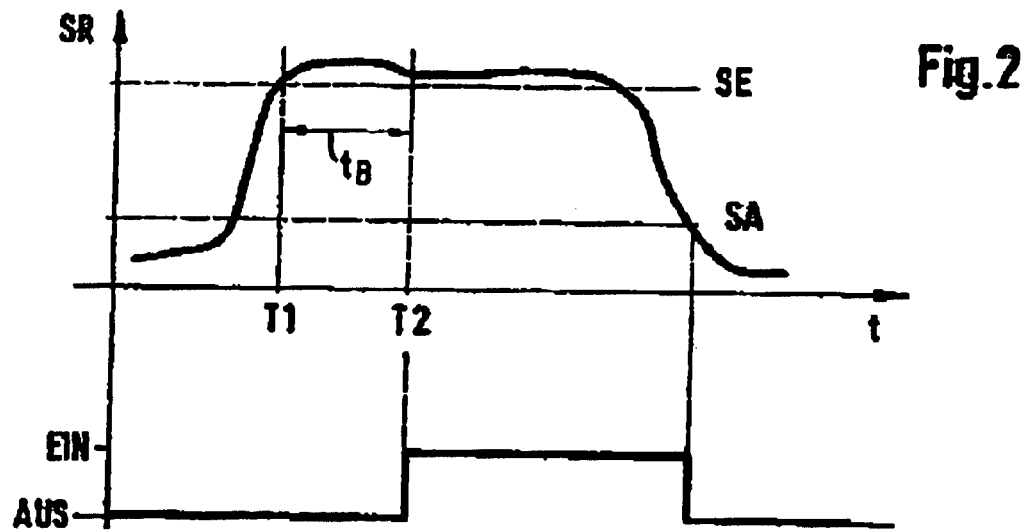
FIG. 2 illustrates an exemplified signal pattern of the directional signal when traveling through a tunnel and a lighting diagram for it.

An exemplary signal pattern for such a case is illustrated at the top in FIG. 2. The vehicle is moving with a speed toward a tunnel and travels through it. In the diagram, direction signals SR of directional sensor 14 are plotted over time. A high ordinate value indicates great darkness. Moreover, at the bottom of FIG. 2, a lighting diagram is illustrated in which the switch-on and switch-off points of lighting devices 16 are illustrated.

In the following, the method of the present invention is explained in greater detail.

The motor vehicle having the device of the present invention is traveling toward a tunnel. Direction signal SR of directional sensor 14 rises ever further, since it is becoming "ever darker" in front of the vehicle. At moment T1, direction signal SR exceeds switch-on threshold SE. Control device 10 now checks whether direction signals SR lie above switch-on threshold SE for the length of minimum time tb. If this is the case, as illustrated in FIG. 2, then after minimum time tb has elapsed, lighting devices 16 are switched on at moment t2 (FIG. 2, bottom).

Figure 3:
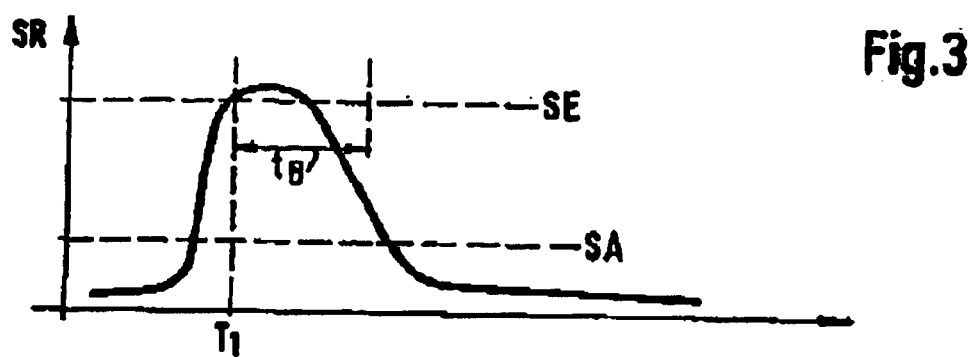
FIG. 3 illustrates an exemplified signal pattern of the directional signal when driving through a bridge.

In FIG. 3, direction signal SR of directional sensor 14 is again plotted over time. In contrast to FIG. 2, however, in this case the vehicle is passing through below a bridge. The brightness detected by directional sensor 14 thereby decreases, which means direction signal SR increases and exceeds the switch-on threshold at moment Tl. Signal SR is again monitored during minimum time tb. In this case, however, signal SR has fallen below switch-on threshold SE before minimum time tb has expired. Because of this, lighting devices 16 are not switched on after minimum time tb has elapsed.

Lighting devices 16 are switched off again when direction signal SR again drops below a switch-off threshold SA. It is also possible not to switch off lighting devices 16 exclusively as a function of direction signals SR, but in addition to take further signals such as those of global sensor 12 or another device.

Figure 4:
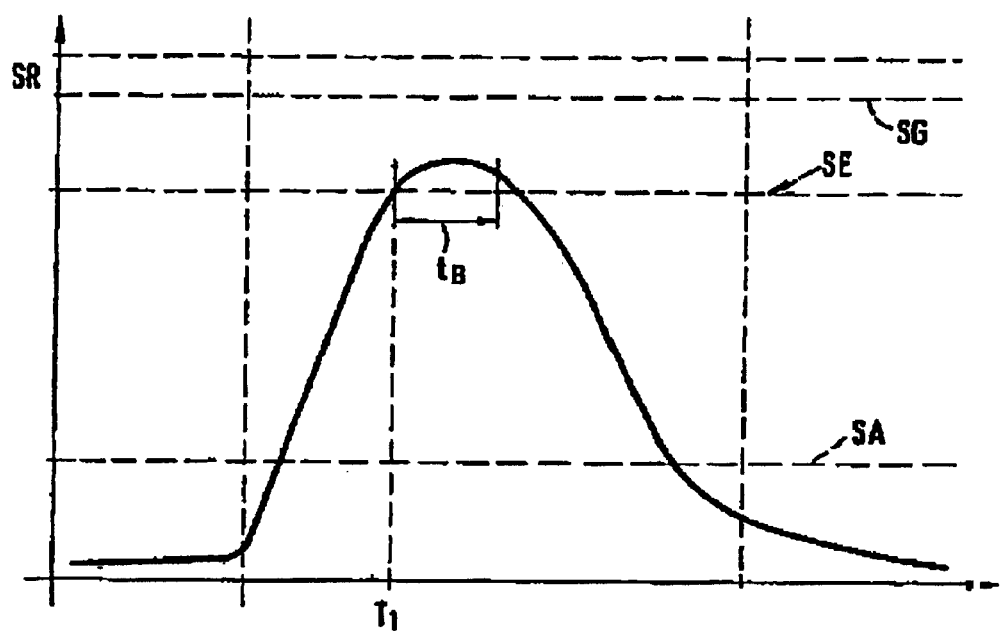
FIG. 4 illustrates an exemplified signal pattern of the directional signal when passing through under a bridge, having a detection threshold.

In one variation of the invention, after direction signal SR has risen and exceeded switch-on threshold SE, it is possible to check whether direction signal SR rises or falls monotonically. This is illustrated in FIG. 4. After the entry of the vehicle into a bridge area, direction signal SR declines and exceeds switch-on threshold SE. At this moment T1, minimum time tb begins during which it is checked whether direction signal SR rises further or—as illustrated in FIG. 4—declines again within minimum time tb. In this case, lighting devices 16 are not switched on, although direction signals SR still lie above switch-on threshold SE after minimum time tb has elapsed.

Moreover, in a further variation, it is possible to evaluate the slope only when a further threshold SG is not exceeded. In this variation, direction signal SR exceeds switch-on threshold SE, whereupon minimum time tb begins to run. If, moreover, direction signal SR exceeds further threshold SG, then lighting devices 16 are switched on after minimum time tb has elapsed regardless of the profile of the slope, provided that at this moment, direction signals SR lie above switch-on threshold SE or further threshold SG.

The slope may also be evaluated in a simple manner, in that after minimum time tb has elapsed, direction signals SR must lie a specific amount above switch-on threshold SE.

Minimum time tb may be variable. For example, it may be established as a function of the signals from global sensor 12, so that in the twilight phase in which the ambient brightness is somewhat lower than when the sun is high, it may be selected to be a little shorter. Moreover, it is also possible to supply signals, for example, from a rain sensor or a GPS or navigation system to control device 10, and to influence minimum time tb as a function of the location and/or the time of day and/or the travel direction. In particular, it is possible to convey signals to control device 10 which are a measure for the speed of the vehicle, and minimum time tb may be shortened or lengthened as a function of these signals.

It is also possible to use a compass by which the horizontal direction in which the vehicle is moved may be determined. In this case, it is possible, for example, to shorten minimum time tb when traveling in a direction from east to west in the evening hours when the sun is low in the west, and to lengthen it in the reverse case.

Control device 10 may also receive weather information, for example, via a radiocommunication service or the Internet, and evaluate it.

What is claimed is:

1. A method for automatic control of lighting devices, comprising:
   detecting a brightness in a specific direction by at least one directional sensor which emits direction signals to a control device;
   switching on the lighting devices by the control device after an expiration of a minimum time which begins when the direction signals;
   and one of exceeding and dropping below a switch-on threshold; and
   are one of above and below the switch-on threshold during the entire minimum time; and
   determining the minimum time in view of an ambient brightness detected by at least one global sensor.

2. The method according to claim 1, wherein the lighting devices are switched on in the switching on step only when the direction signals are monotonically one of rising and falling during the entire minimum time.

3. The method according to claim 1, wherein the lighting devices are switched on in the switching on step only when the director signals are strictly monotonically one of rising and falling during the entire minimum time.

4. The method according to claim 1, wherein the directional sensor detects the brightness in the detecting step from an acquisition cone which, in an installed state, points in a direction of travel, and which has an acceptance angle that is at least less than 90°.

5. The method according to claim 4, wherein the acceptance angle is less than 70°.

6. The method according to claim 4, wherein the acceptance angle is less than 45°.

7. The method according to claim 1, wherein the minimum time is determined in the determining step in view of a speed of a motor vehicle.

8. The method according to claim 7, wherein the determining step includes a substep of reading the minimum time from a table in a memory of the control device as a function of at least one of the ambient brightness and the speed.

9. The method according to claim 1, wherein the determining step includes a substep of reading the minimum time from a table in a memory of the control device as a function of at least one of the ambient brightness and a speed.

10. The method according to claim 1, wherein the minimum time is determined in the determining step as a function of at least one of a horizontal direction in which a motor vehicle is moved, a time of day and a place at which the motor vehicle is located.

11. The method according to claim 1, wherein the lighting devices are arranged in a motor vehicle.

12. A device for automatic control of lighting devices, comprising:
   at least a directional sensor configured to detect a brightness in a specific direction;
   a control device configured to switch on the lighting devices after an expiration of a minimum time which begins when direction signals emitted by the at least one directional sensor to the control device: (a) are one of exceeding and dropping below a switch on threshold, and (b) are one of above and below the switch on threshold during the entire minimum time; the control device configured to determine the minimum time in view of an ambient brightness detected by at least one global sensor; and
   a timer configured to emit time signals to the control device.

13. The device according to claim 12, wherein the device is configured to be arranged in a motor vehicle.

* * * * *